US008396024B2

(12) United States Patent
Baum et al.

(10) Patent No.: US 8,396,024 B2
(45) Date of Patent: Mar. 12, 2013

(54) COOPERATIVE COMMUNICATIONS USING MULTIPLE ACCESS POINTS TO IMPROVE DATA INTEGRITY

(75) Inventors: Kevin L. Baum, Rolling Meadows, IL (US); Timothy A. Thomas, Palatine, IL (US)

(73) Assignee: Motorola Mobility LLC, Libertyville, IL (US)

( * ) Notice: Subject to any disclaimer, the term of this patent is extended or adjusted under 35 U.S.C. 154(b) by 564 days.

(21) Appl. No.: 12/360,345

(22) Filed: Jan. 27, 2009

(65) Prior Publication Data
US 2010/0189047 A1 Jul. 29, 2010

(51) Int. Cl.
*H04W 4/00* (2009.01)
(52) U.S. Cl. .................................. 370/328; 455/443
(58) Field of Classification Search .................. None
See application file for complete search history.

(56) References Cited

U.S. PATENT DOCUMENTS

| | | | | |
|---|---|---|---|---|
| 2007/0076663 A1* | 4/2007 | Qi et al. | ........................ | 370/331 |
| 2009/0111473 A1* | 4/2009 | Tao et al. | ....................... | 455/440 |
| 2010/0029279 A1* | 2/2010 | Lee et al. | ....................... | 455/436 |
| 2010/0112957 A1* | 5/2010 | Kong et al. | ................ | 455/67.11 |

OTHER PUBLICATIONS

Lee, Chin-Chun et al.: "Effect of Soft and Softer Handoffs on CDMA System Capacity", IEEE Transactions on Vehicular Technology, vol. 47, No. 3, Aug. 1998, pp. 830-839.
Zhang, Hongyuan et al.: "Cochannel Interference Mitigation and Cooperative Processing in Downlink Multicell Multiuser MIMO Networks", EURASIP Journal on Wireless Communications and Networking 2004:2, 2004 Hindawi Publishing Corporation, pp. 222-235.
802.16e—IEEE Standard for Local and metropolitan area networks: Part 16: Air Interface for Fixed and Mobile Broadband Wireless Access Systems, Amendment 2: Physical and Medium Access Control Layers for Combined Fixed and Mobile Operation in Licensed Bands and Corrigendum 1, IEEE Std 802.16e-2005 and IEEE Std 802.16-2004/Cor1-2005, IEEE Computer Society and the IEEE Microwave Theory and Techniques Society Feb. 28, 2006, Sections 8.4.1-8.4.4.2, 8.4.5.3.4, 8.4.5.3.17-18.

* cited by examiner

*Primary Examiner* — Chi Pham
*Assistant Examiner* — Mohammad Adhami

(57) ABSTRACT

A method (300, 400, 500, 600) of communicating with a subscriber station (102). Responsive to determining that a supplemental communication link with the subscriber station is desirable, at least a second access point (106, 108, 110, 112, 114, 116) can be identified to establish the supplemental communication link with the subscriber station. Information can be communicated to the second access point. The information can identify the subscriber station and a pilot zone in which downlink supplemental data is to be transmitted from the second access point to the subscriber station. Downlink supplemental data (150) also can be communicated to the second access point. The downlink supplemental data can improve integrity of data transmitted from a first access point (104) to the subscriber station when the downlink supplemental data is transmitted to the subscriber station from the second access point.

9 Claims, 3 Drawing Sheets

300

```
Identify at least a second access point
(AP) to establish the supplemental
communication link with a SS in
response to determining that a
supplemental communication link with
the SS is desirable
                                    302
```

↓

```
Communicate to the second AP
information that identifies the SS and a
pilot zone in which downlink
supplemental data is to be transmitted
from the second AP to the SS
                                    304
```

↓

```
Communicate to the second AP
downlink supplemental data that
improves integrity of data transmitted
from a first AP to the SS when the
downlink supplemental data is
transmitted to the SS from the second
AP in the pilot zone in coordination
with the first AP
                                    306
```

```
Identify at least a second access point
(AP) to establish the supplemental
communication link with a subscriber
station (SS) in response to determining
that a supplemental communication link
with the SS is desirable
                                    402
```

↓

```
Communicate to the second AP
information that identifies the SS and a
pilot zone allocated to the SS to
transmit uplink data to the first AP
                                    404
```

↓

```
Receive from the second AP uplink
supplemental data corresponding to data
transmitted from the SS to the first AP,
the uplink supplemental data improving
integrity of the data transmitted from
the SS to the first AP when the uplink
supplemental data is detected by the
second AP
                                    406
```

FIG. 4

COOPERATIVE COMMUNICATIONS USING MULTIPLE ACCESS POINTS TO IMPROVE DATA INTEGRITY

BACKGROUND OF THE INVENTION

1. Field of the Invention

The present invention generally relates to RF communication systems and, more particularly, to mobile communications.

2. Background of the Invention

A cellular communications system typically comprises a plurality of access points, such as base transceiver stations, each of which services mobile stations active in a respective geographic region, or cell, over allocated communication channels. The channel quality for these communication channels can vary as the mobile stations move about the cells. For example, as a mobile station moves away from an access point, the receive signal strength of signals communicated between the access point and the mobile station generally decrease. This typically results in a decrease in a carrier-to-interference (C/I) ratio, which is one of several channel quality measurements. In that regard, the channel quality oftentimes is lowest at the fringe of the cell serviced by the access point.

In some instances the channel quality at the fringe of the cell may sufficiently degrade such that the communication link between the mobile station and the access point only supports a marginal and insufficient data rate.

SUMMARY OF THE INVENTION

The present invention relates to a method of communicating with a subscriber station. The method can include, responsive to determining that a supplemental communication link with the subscriber station is desirable, identifying at least a second access point to establish the supplemental communication link with the subscriber station. Information can be communicated to the second access point. Such information can identify the subscriber station and a pilot zone in which downlink supplemental data is to be transmitted from the second access point to the subscriber station. Downlink supplemental data also can be communicated to the second access point. The downlink supplemental data can improve integrity of data transmitted from a first access point to the subscriber station when the downlink supplemental data is transmitted to the subscriber station from the second access point in the pilot zone in coordination with data transmitted to the subscriber station from the first access point.

Another method of communicating with a subscriber station can include identifying at least a second access point to establish the supplemental communication link with the subscriber station in response to determining that a supplemental communication link with the subscriber station is desirable. Information that identifies the subscriber station and a pilot zone allocated to the subscriber station to transmit uplink data to the first access point also can be communicated to the second access point. Further, uplink supplemental data can be received from the second access point. The uplink supplemental data can improve integrity of data transmitted from the subscriber station to the first access point when the supplemental data is detected by the second access point.

Another method of communicating with a subscriber station can include receiving from a first access point information that identifies the subscriber station and a pilot zone in which downlink supplemental data is to be communicated to the subscriber station. Downlink supplemental data to be transmitted to the subscriber station to improve integrity of data transmitted from the first access point to the subscriber station can be received from the first access point. The downlink supplemental data can be transmitted to the subscriber station within the pilot zone.

Another aspect of the present invention relates to a first access point. The first access point can include a controller that, during a communication session between the first access point and a subscriber station, determines whether a supplemental communication link with the subscriber station is desirable. The first access point also can include at least one communication module. When the controller determines that the supplemental communication link with the subscriber station is desirable, via the communication module, the controller can communicate to at least a second access point information that identifies the subscriber station and a pilot zone in which downlink supplemental data is to be transmitted from the second access point to the subscriber station. Via the communication module, the controller also can communicate to the second access point downlink supplemental data, the downlink supplemental data improving integrity of data transmitted from the first access point to the subscriber station when the downlink supplemental data is transmitted to the subscriber station from the second access point.

BRIEF DESCRIPTION OF THE DRAWINGS

Preferred embodiments of the present invention will be described below in more detail, with reference to the accompanying drawings, in which:

FIG. 3 is a flowchart that is useful for understanding the present invention;

FIG. 4 is another flowchart that is useful for understanding the present invention;

DETAILED DESCRIPTION

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

Arrangements described herein relate to the use of multiple access points to cooperatively communicate with a subscriber station. For example, if a subscriber station has established a communication link with a first access point (AP) on a particular communication channel, and the channel quality on that communication channel falls below a threshold value, a second AP can be used to supplement the primary, or original, communication link. In particular, signals to be transmitted to the subscriber station can be transmitted on the same communication channel via both the first AP and the second AP. Moreover, signals transmitted by the subscriber station can be detected both by the first AP and the second AP, and processed accordingly to improve data integrity.

The subscriber station need not know that more than one communication link has been established. That is, from the perspective of the subscriber station, RF signals may be transmitted and received in a conventional manner as though the subscriber station is communicating over a single communication link. From the perspective of the infrastructure of the communication system, however, in addition to the primary communication link, one or more additional communication links can be established for the subscriber station to supplement the primary communication link.

Figure 1:
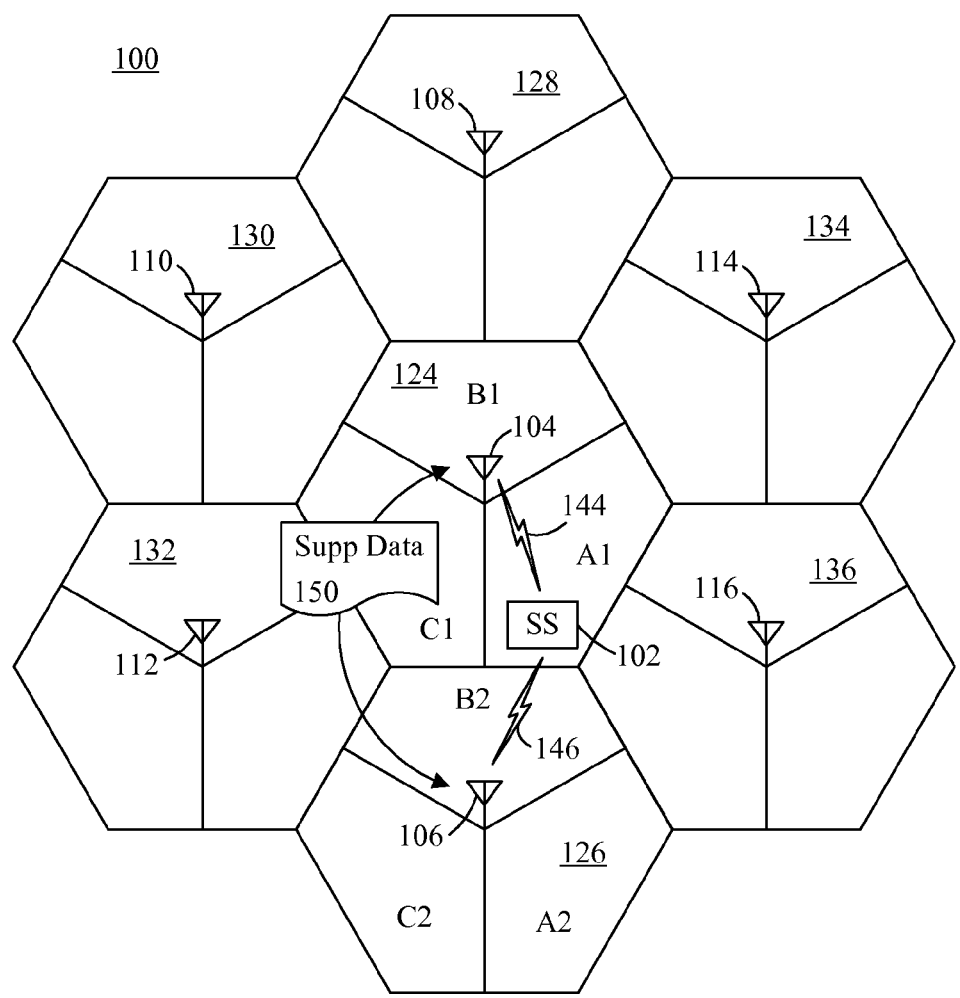
FIG. 1 depicts a communication system that is useful for understanding the present invention.

FIG. 1 depicts a communication system 100 that is useful for understanding the present invention. The communication system 100 can include one or more subscriber stations, such as a subscriber station (SS) 102. The SS 102 can be any wireless communication device, for example a telephone, a mobile telephone, a mobile radio, a personal digital assistant, a computer, a mobile computer, a mobile terminal, an application specific device, a portable media device, or any other device that can transmit and/or receive wireless communication signals.

The communication system 100 also can include a plurality of access points (APs) 104, 106, 108, 110, 112, 114, 116. The APs 104-116 can be, for example, base transceiver stations, repeaters, relay stations (e.g. amplify-and-forward relay stations, decode-and-forward relay stations, etc.), LAN access points, WLAN access points, individual transceivers, components within a system comprising a plurality of transceivers, or any other systems comprising equipment for wirelessly communicating with mobile communication systems, such as the SS 102. As such, each AP 104-116 can comprise one or more antenna elements and one or more components for transmitting and receiving RF signals (e.g. transceivers). As known to those skilled in the art, the APs 104-116 also may include any of a myriad of other suitable components, for instance network adapters, communication ports, controllers, and so on, but the invention is not limited in this regard.

The SS 102 and the APs 104-116 can be configured to communicate data via IEEE 802 wireless communications, for example, 802.11 and 802.16 (e.g. WiMAX), 3G, 4G, EUTRAN, UMB, WPA, WPA2, GSM, TDMA, CDMA, WCDMA, OFDM, LTE, and/or direct wireless communication. Still, the invention is not limited in this regard and the SS 102 and APs 104-116 can be configured to communicate RF signals in accordance with any suitable communications standards, protocols, and/or architectures, or a suitable combination of such standards, protocols, and/or architectures.

The APs 104-116 can be distributed over an area serviced by the communication system 100. For example, in one arrangement, each of the APs 104-116 can be located in a respective cell 124, 126, 128, 130, 132, 134, 136. In another arrangement, a plurality of APs 104-116 can be located in one or more of the cells 124-136. As used herein, a cell is a particular region serviced by at least one AP. A plurality of cells 124-136 may be distributed over an area to provide continuous wireless communication service over a larger region, for instance over a region comprising each of the cells 124-136.

In an arrangement in which the communication system 100 is a wide area network (WAN), such as a cellular communication system, the cells 124-136 can be geographically defined. In an arrangement in which the communication system 100 is a wireless local area network (WLAN), the cells 124-136 can be defined in another suitable manner, for instance by a particular location within a room and a radius of coverage. Notwithstanding, those skilled in the art will appreciate that the cells 124-136 can be defined in any other suitable manner and the invention is not limited to these examples.

Optionally, one or more of the APs 104-116 can implement a channel reuse scheme. By way of example, the AP 104 can comprise a plurality of directional antennas and/or directional antenna arrays, and each antenna or antenna array can service a different portion of the cell 124. For instance, a first antenna array can service a region A1, a second antenna array can service a region B1, and a third antenna array can service a region C1. In such an arrangement, the AP 104 can service two or more of the regions A1, B1, C1 using the same channels and/or sub-channels. In a similar manner, the AP 106 can service two or more regions A2, B2, C2 using the same channels and/or sub-channels. Moreover, such channels and/or sub-channels can be reused among the plurality of APs 104-116. In this arrangement, a system, such as a base transceiver station, comprising a plurality of transceivers and serving multiple regions may be considered a single AP.

In another arrangement, an AP 104-116 can service a single region within a cell 124-136. For example, a first AP can service a region A1 in cell 124, a second AP can service a region B1 in cell 124, and a third AP can service a region C1 in cell 124. Similarly, a fourth AP can service a region A2 in cell 126, a fifth AP can service a region B2 in cell 126, and a sixth AP can service a region C2 in cell 126. In this arrangement, a system, such as a base transceiver station, that comprises a plurality of transceivers serving multiple regions may be considered to comprise a plurality of APs.

In operation, the SS 102 can be a participant in a communication session, and such communication can be supported by a primary communication link 144 established between the SS 102 and the AP 104 on a suitable channel/sub-channel. In this regard, the AP 104 may be considered a AP 104 for the SS 102. Accordingly, the SS 102 can receive its medium access control layer messages and associated resource assignments from the AP 104. In WiMAX, for example, a downlink MAP can define burst start times for both time division multiplex and time division multiple access (TDMA) by a SS on the downlink. An uplink MAP can define an access for a scheduling interval, as is known to those skilled in the art.

Determining Whether a Supplemental Communication With the Subscriber Station is Desirable During the communication session, the SS 102 and/or the AP 104 can monitor information relevant to the quality of the primary communication link 144 (hereinafter "channel quality information" or, more simply, "CQI"). For example, the SS 102 and/or the AP 104 can measure a carrier-to-interference (C/I) ratio, a signal to noise ratio (SNR), a carrier to interference and noise ratio (CINR), a quality of service (QoS), a data rate, a modulation order (e.g., QPSK, 16-QAM, 64-QAM or others), a coding rate (e.g., rate-¼, ⅓, ½, ¾ turbo code, etc.), a combined modulation and coding rate (e.g., a number of information bits per channel use), a number of hybrid ARQ retransmissions, a number of dominant interferers, interference levels and/or any other parameters that affect the quality of communications between the SS 102 and the AP 104. In an arrangement in which the SS 102 monitors CQI, the SS 102 can communicate data relevant to the CQI to the AP 104, or another suitable system.

Regardless of whether CQI is being monitored by the SS 102 and/or the AP 104, if the CQI indicates that the channel quality of the primary communication link 144 is below a threshold value, then at least one other AP 106-116 can be identified to supplement the primary communication link 144 with a supplemental communication link 146. In particular, the identified AP(s) 106-116 can transmit to the SS 102, and/or receive from the SS 102, supplemental data 150 that improves the integrity of data communicated between the AP 104 and the SS 102. In one arrangement, the time-frequency resources of the supplemental communication link 146 can be the same as those of the primary communication link 144.

As noted, CQI may not be the only indicator used to determine whether another AP 106-116 should be used to provide the supplemental communication link 146. For example, if SS 102 is an emergency responder or another important user that needs to have a guaranteed QoS, based on this need, an AP 106-116 can be selected to provide the supplemental communication link 146 in order to insure that the required QoS is provided. In another example, the AP 104 may determine if another AP 106-116 should be used for providing supplemental communication link 146 based on the geographical location of the SS 102 (e.g., if the SS 102 is near a cell boundary).

Selection of a Second AP to Establish the Supplemental Communication Link

When it is determined that a supplemental communication link 146 with the SS 102 is desirable (e.g. the channel quality of the primary communication link 144 is below the threshold value), the AP 104 (or another suitable device or system) can identify another AP 106-116 which may be suitable for providing the supplemental communication link 146 over which the supplemental data 150 may be communicated. This identification can be based on any of a myriad of parameters. Such parameters can include, but are not limited to, the present location of the SS 102, movement of the SS 102, anticipated future locations of the SS 102, present locations of the APs 106-116 and/or proximity of the APs 106-116 to the present location or an anticipated future location of the SS 102.

A signal quality measurement and/or a signal strength measurement from the APs 106-116 also can be used to identify another AP 106-116 which may be suitable for providing the supplemental communication link 146. For example, the APs 106-116 can measure the signal strength transmissions by the SS 102 in response to a request from the AP 104, and the APs 106-116 can report their respective signal strength measurements to the AP 104. In another arrangement, the SS 102 can monitor the signal quality of downlink transmissions from one or more of the APs 106-116 to identify another AP 106-116 which may be suitable for providing the supplemental communication link 146. The SS 102 can report this type of information to the AP 104 or another suitable AP 106-116.

In another arrangement, an AP 106-116 can be chosen from a list of suitable APs maintained by the SS 102, the AP 104 or an AP location database (e.g. within a global positioning system). Monitoring of a SS's location and/or movement is well known in the art. Anticipated future locations of the SS 102 can be predicted by the device's movement, speed, direction of travel, typical movement patterns, etc.

Identification of an AP 106-116 suitable for providing the supplemental communication link 146, and determination of whether to use such AP 106-116 to provide the supplemental communication link 146, also can be based on other types of information. Examples of such information can include, but is not limited to, locations of the APs 106-116, capabilities of the APs 106-116, bandwidth available on the APs 106-116, the quality of the SS's signals as measured by the APs 106-116, the quality of the signal from individual APs 106-116 as measured by the SS 102, and so on. In such arrangements, the APs 106-116 can communicate relevant data to the AP 104 or to another suitable device or system operatively connected to the AP 104. Such other device or system can be, for example, a base station controller or a network server that is tasked with identifying the AP 106-116 that is best suited to provide the supplemental communication link 146.

Establishing the Supplemental Communication Link

In the present example, assume that the AP 106 has been identified as being best suited to provide the supplemental communication link 146. A request can be generated by the AP 104 (or another suitable device or system) requesting that the AP 106 establish the supplemental communication link 146 over which supplemental data 150 can be communicated. The request can be communicated to the AP 106, or to another device or system that interfaces with the AP 106. For instance, if the AP 106 is a base transceiver station, the request can be communicated to a corresponding base station controller. Of course, one skilled in the art will appreciate that the invention is not limited to this example, and the request can be generated by, and sent to, any of a myriad of suitable devices or systems within the communication system 100.

The request can include information that indicates the channel resources on which the supplemental data 150 is to be communicated, as well as any other configuration parameters that may be used by the AP 106 to establish communications with the SS 102 in a suitable manner. For example, the request can indicate an identifier that identifies the SS 102. The identifier can be a Media Access Control (MAC) address of the SS 102, a network address, for example an IP address, or any other identifier suitable for identifying the SS 102 to the AP 106. The request also can include, for example, an identification of at least one pilot zone assigned to the AP 106. The pilot zone can be one which is assigned for transmitting pilot symbols to the SS and/or a pilot zone allocated to the SS to transmit uplink data to a first AP.

Optionally, additional information also may be communicated to the second AP 106. For instance, the AP 104 can communicate to the AP 106 an orthogonal frequency-division multiple access (OFDMA) sub-channel permutation parameter that indicates a sub-channel permutation mode to be used within the pilot zone, a permutation base parameter that indicates an initial condition to be used for a permutation mode within the pilot zone, and/or a scrambling sequence parameter that indicates a scrambling sequence to be used within the pilot zone. The optional information also may include information that identifies a location of the SS and/or a movement related to the SS.

The AP 106 (or other device or system), can generate a response indicating the availability of the AP 106 to perform the requested task of transmitting and receiving the supplemental data 150. For example, if the channel resources requested for communicating with the SS 102 are not currently being used by the AP 106, and the AP 106 is otherwise available to support the supplemental communication link 146, the response can indicate that the AP is available.

If the requested channel resources (e.g. channel(s), sub-channel(s), etc.) are in use, the AP 106 optionally may switch another device (not shown) with which it is communicating over the requested resources to another available channel resource in order to free the requested channel resource(s). In this case, the response can indicate the AP 106 is available.

Alternatively, the response can indicate one or more channel resources that are available on the AP 106. The AP 104 then can assign to the SS 102 one or more channel resources indicated by the AP 106 as being available. For example, one or more messages can be communicated to the SS 102 to assign new channel resource(s) to the SS 102. Further, the AP 104 can indicate to the SS 102 the respective pilot zones that are reserved for communications with the SS 102. The AP 104 also can indicate to other SSs within the region A1 or cell 124 which pilot zones are reserved for SS (e.g. the SS 102).

If the AP 104 is able to assign new channel resources to the SS 102, the AP 104 can communicate a request to the AP 106 indicating the new channel resources. In response, the AP 106 can communicate with other SSs within the region B2 or cell 126 to indicate which pilot zones are reserved for the SS 102. Notwithstanding, it is not required that the SS 102 have knowledge that the pilot zones are assigned to the AP 106. Indeed, as noted, the SS 102 need not know that the AP 106 is being used to communicate data.

If the AP 106 cannot free the requested channel resource(s), or the AP 106 is otherwise unavailable, the response can indicate such. A next best suited AP 108-116 then can be identified and another request can be sent to the identified AP. The process can continue until a response is received by the AP 104 (or other device/system) that indicates an AP is available to establish the supplemental communication link 146.

The request(s) and response(s) can be communicated over a backhaul communication channel (wired and/or wireless), and/or via other suitable communications infrastructure. In addition, the downlink supplemental data 150 also can be communicated to the AP 106, and uplink supplemental data 150 can be received from the AP 106, via the backhaul communication channel and/or other communications infrastructure.

For this example, it may be assumed that the AP 106 is available to transmit to, and receive from, the SS 102 the supplemental data 150. Prior to establishing the supplemental communication link 146, it may be advantageous for the AP 104 and AP 106 to insure that their respective time-bases are suitably aligned.

For example, timing signals can be provided to facilitate synchronization of the signals transmitted by the APs 104, 106. The AP 104, for instance, can communicate one or more timing signals to the AP 106 via the backhaul. In another arrangement, an AP 104, 106 can provide a timing signal reference from a global positioning system (GPS), as is known in the art. In an arrangement in which TDMA, CDMA, OFDM, or another form of multiplexing is implemented to provide a plurality of sub-channels, the timing signals can be used to insure that transmissions to the SS 102 over the communication links 144, 146 are properly synchronized in time and/or phase so as to be received by the SS 102 on the same sub-channel.

In an example of a WiMAX implementation, one or more APs (e.g. the APs 104, 106) may communicate information related to their respective zone information elements (e.g. a zone-switch IEs, STC DL Zone IEs, TD ZONE IEs, zone configuration messages, zone configuration parameters, etc.). A zone information element can specify a dedicated pilot zone for a time region of a frame containing the channel resource allocation. Accordingly, the primary communication link 144 and supplemental communication link 146 may be established in the same pilot zone. An example of a pilot zone is a portion of a communication frame (e.g., a time-frequency region) that contains both data and pilot signals wherein only the pilot signals within a particular resource assignment/assignments should be used for channel estimation and demodulation, rather than using all of the pilot signals that may be present on the communication channel.

One type of pilot zone is a zone in which dedicated or user-specific pilots are transmitted along with the data signals. Another example of a pilot zone is a broadcast/multicast zone, where the pilot signals in the broadcast zone should not be used to assist in channel estimation/demodulation for unicast data outside the broadcast zone. Specific resources allocated to a particular device for an uplink transmission also can be considered a pilot zone. More generally, an entire uplink communication frame can be a pilot zone (both pilot and data signals), considering that each device transmits a separate pilot signal and that the pilots transmitted by one device should not be used to estimate the channel of another device.

Additional values that may be set to be the same in the APs 104, 106 can include a permutation parameter, such as a DL_PermBase parameter, and a PRBS_ID parameter. These parameters can be predetermined or negotiated between the APs 104, 106 and may be communicated from one AP to the other (e.g., from AP 104 to AP 106) in order to identify the parameter value(s) to be used by the other AP 104, 106. By setting DL_PermBase and PRBS_ID identically in the APs 104, 106, the bit scrambler (randomizer) of the AP 106 can be initialized with the same seed as the AP 104. Thus, if the AP 104 provides to the AP 106 uncoded data that is to be transmitted to the SS 102, the AP 106 can encode, interleave and/or scramble the data before transmitting the data to the SS 102. If, however, the data is encoded by the AP 104, the AP 106 need not perform encoding on the data.

Also, by identically setting the permutation parameter, DL_PermBase, and PRBS_ID in the APs 104, 106, the sub-channel physical mappings can become the same for the APs 104, 106 inside the dedicated pilot zone, thus enabling proper over-the-air combining of the respective data signals transmitted by the APs 104, 106. Further, the setting of the values also can synchronize the pilot values of the APs 104, 106.

Cooperative Selection of Antenna Transmit Weights

The present arrangements also can include enabling cooperative selection of antenna transmit weights for the AP 104 and the AP 106. For example, distributed Alamouti space-time coding (STC) or space-frequency coding (SFC) can be implemented. In this example, a two antenna STC/SFC case will be described, but it should be noted that a four antenna case can be similarly constructed by, for example, using either two antennas per AP, or using four APs 106-112, each of which comprises one "virtual" antenna. Various other combinations of physical and virtual antennas can be used.

A virtual antenna can be a single antenna or a combination of physical antenna elements. When a virtual antenna comprises a plurality of physical antennas, such antennas may be considered a single virtual antenna for certain, but not necessarily all, purposes. The use of a plurality of antennas to form a single virtual antenna can be implemented in any suitable manner, examples of which include, but are not limited to, over-the air signal summation, applying transmit weights of the physical antenna elements to provide beamforming, cyclic delay diversity and codebook.

In an arrangement in which a two antenna code or a two antenna weight vector is used, the AP 104 can act as first virtual antenna and the AP 106 can act as a second virtual antenna. For the pilot zone that will be used for cooperative transmission, the AP 104 can configure the zone as a two transmit antenna zone (e.g., utilizing a ZONE IE message with the appropriate parameter settings) even though a single physical or virtual antenna may be used. The AP 106 also can configure the corresponding pilot zone as a two transmit antenna zone even though it may choose to use only one physical or virtual antenna.

Within the pilot zone, the AP 104 may be configured to only transmit its pilot sequence in the first antenna positions defined for a two antenna transmission system. The AP 104 can leave the second antenna positions empty or can fill the second antenna positions with null symbols. Within the same pilot zone, the AP 106 can be configured to only transmit its pilot sequence in the second antenna positions defined for the two antenna transmission system. Thus, the AP 106 can leave the first antenna positions empty. In another arrangement, the AP 104 may use the second antenna positions and the AP 106 can use the first antenna positions.

Establishing a Spatial Diversity Configuration for the Supplemental Communication Link The AP 106 can cooperate with the AP 104 to implement spatial diversity. Examples of spatial diversity schemes include cyclic delay diversity space-time coding, space-frequency coding, switched time transmit diversity and switched frequency transmit diversity. Nonetheless, the invention is not limited in this regard and other suitable spatial diversity schemes may be used. Spatial diversity can improve the reliability of data transmission in a wireless communication system. For instance, the supplemental data 150 communicated from the AP 104 (or other suitable device or system) to the AP 106 for transmission to the SS 102 can be coded in a manner that improves the diversity of the signal received at the SS 102, which can result in a better QoS than if the second AP 106 was not utilized.

In an arrangement in which spatial diversity is implemented, and space-time coding and/or space-frequency coding is used to code data into the RF signals that are transmitted over the respective communication links 144, 146, within the pilot zone the AP 104 can be assigned a first pilot sequence in which to transmit pilot signals to the SS 102 within a channel and/or sub-channel, and the AP 106 can be assigned a second pilot sequence within the same pilot zone in which to transmit pilot signals to the SS 102 within the channel and/or sub-channel. The pilot signals transmitted in the respective pilot sequences can be received and processed by the SS 102 for the purpose of channel estimation. From perspective of the SS 102, it may appear that the multiple pilot signals are both generated by the AP 104, for example by multiple transmit antennas at the AP 104.

The first and second pilot sequences can be distinguished from one another based on frequency, phase and/or time. The pilot sequences can be selected by the AP 104, or another suitable device or system. In addition, the AP 104 (or other device or system) can communicate to the AP 106 information indicating which pilot sequences are assigned to the AP 106.

Further, the AP 104 can communicate with the SS 102 to indicate the respective pilot sequences that are reserved for communications with the SS 102 within the pilot zone and may also indicate the location (e.g., time-frequency region) of the pilot zone. The AP 104 also can indicate to other SSs within the region A1 or cell 124 which pilot sequences are reserved for another SS (e.g. the SS 102). In one arrangement, the AP 104 also can indicate the location of the pilot zone. In addition, the AP 106 can communicate with other SSs within the region B2 or cell 126 to indicate which pilot sequences are reserved for another SS. Notwithstanding, it is not required that the SS 102 have knowledge that the pilot sequences are assigned to different APs 104, 106. Indeed, as noted, the SS 102 need not know that the AP 106 is being used to communicate data.

In the aforementioned arrangements, each of the APs 104, 106 can be considered to operate as a virtual antenna within the spatial diversity system. If the AP 104 comprises a plurality of antennas that service the region A1, two or more of these antennas can be used to cooperatively transmit in the first pilot zone to replicate the performance of a single antenna with greater power. Similarly, two or more antennas of the AP 106 that service the region B2 can be used to cooperatively transmit in the second pilot zone to replicate the performance of a single antenna with greater power.

Establishing a MIMO Configuration for the Supplemental Communication Link

In a multiple input/multiple output (MIMO) arrangement, each of the APs 104, 106 can be assigned a plurality of pilot sequences in a channel and/or sub-channel. For example, a first and a second pilot sequence can be assigned to the AP 104, and a third and a fourth pilot sequence can be assigned to the AP 106. In this arrangement, the AP 104 can transmit pilot signals within the first and second pilot sequences, and the AP 106 can transmit pilot signals within the third and fourth pilot sequences. Of course, any number of pilot sequences can be defined, and the pilot sequences can be allocated among the APs 104, 106, as well as other APs 108-116, in any suitable manner.

In a WiMax or other 802.16 type network, the AP 104 can act as a first virtual antenna and the AP 106 can act as a second virtual antenna, and the MIMO Matrix-B of the 802.16 standard can be applied across both of the APs 104, 106. The AP 104 can configure the pilot sequence that will be used for cooperative transmission as a two stream zone (e.g., utilizing a ZONE IE message with the appropriate parameter settings) even though it may only have one physical or virtual antenna. The AP 106 also can configure the corresponding pilot sequence as a two stream sequence even though it may only have one physical or virtual antenna.

Within the pilot sequence, the AP 104 need only transmit its pilots in the first antenna position defined for a two antenna transmission configuration, thus leaving the second antenna positions empty. Within the same pilot sequence, the AP 106 need only transmit its pilots in the second antenna position a two antenna transmission configuration, thus leaving the first antenna positions empty. Again, in another arrangement, the AP 104 may use the second antenna positions and the AP 106 can use the first antenna positions.

Use of Beamforming

The AP 104 optionally may implement beamforming techniques for transmitting and receiving RF signals over the primary communication link 144. Similarly, the AP 106 optionally can implement beamforming techniques for transmitting and receiving RF signals over the supplemental communication link 146. Examples of suitable beamforming techniques include, but are not limited to, Eigen-beamforming and code-book based beamforming.

In one arrangement, both the APs 104, 106 can implement beamforming to communicate with the SS 102 so as to cooperatively form a single virtual antenna. Notwithstanding, the use of beamforming to communicate with the SS 102 need not be required, however. Moreover, if one of the APs 104, 106 communicates with the SS 102 using beamforming techniques, it is not a requirement that the other AP 104, 106 also implement beamforming.

Downlink Supplemental Communications

In the downlink mode, supplemental data 150 to be transmitted by the AP 106 can be communicated to the AP 106 from the AP 104, or another suitable device or system (e.g. a base station controller or a network server). This supplemental data 150 may be referred to as "downlink supplemental data." The AP 106 can be configured to transmit the supplemental data 150 to the SS 102 over the supplemental communication link 146 in the pilot zone indicated by the AP 104 for transmitting the downlink supplemental data to the SS 102.

In one arrangement, the downlink supplemental data can be substantially the same as data being transmitted to the SS 102 by the AP 104, though it is not required that such data include pilot signals. Indeed, the data packets/frames transmitted by the AP 106 to the SS 102 can be duplicates of those transmitted to the SS 102 from the AP 104. In this regard, such data can supplement the data being transmitted by the AP 104 to improve data integrity. In another arrangement, the downlink supplemental data may include null data, which can be used to improve communications between the AP 104 and the SS 102 by reducing backhaul loading and reducing the overall interference level in the communication system 100. In another arrangement, the AP 106 can transmit downlink supplemental data to the SS 102 while the AP 104 remains silent, though the SS 102 may still receive its time-frequency assignment and control channel information from the AP 104.

In one arrangement, the transmission of the downlink supplemental data to the SS 102 by the AP 106 can be a unicast. As used herein, the term "unicast" means communication between a single sender and a single receiver within a network. Nonetheless, a receiver can receive multiple unicasts. Thus, the AP 106 can unicast the same data to the SS 102 as the data that is being unicast to the SS 102 from the AP 104.

Notably, the transmission of the downlink supplemental data can be implemented without requiring the SS 102 to monitor for pilot signals specifically generated by the AP 106 or to establish network presence with the AP 106. Instead, the AP 106 can receive from the AP 104 (or another suitable device or system) any information that may be necessary to identify the SS 102 and the channel resources to be used to communicate with the SS 102. For example, the channel resources assigned to the AP 106 for communicating with the SS 102 over the supplemental communication link 146 can be the same as those used by the AP 104 to transmit to the SS 102 over the primary communication link 144. In an arrangement in which the AP 106 is tasked with transmitting dedicated pilots to the SS 102, the AP 106 also can transmit dedicated pilots on the same channel resources used by the AP 104 to transmit the dedicated pilots.

Coordination of the data transmissions can be implemented as previously described, and optionally may include dynamically selecting and/or adjusting the power level at which the APs 104, 106 transmit RF signals to the SS 102. For example, the power level at which the AP 106 transmits RF signals to the SS 102 may be selected based on the previously described CQI measurements, and adjusted as the CQI measurements change.

Uplink Supplemental Communications

On uplink from the SS 102, the AP 106 can monitor the same channel and/or sub-channel used by the SS 102 to communicate with the AP 104. One or more RF signals transmitted by the SS 102 in the pilot zone indicated by the AP 106 can be detected by the AP 106. Notably, it is not a requirement that the SS 102 be specifically configured to simultaneously communicate over both the primary communication link 144 and the supplemental communication link 146. For instance, the SS 102 need not specifically target the RF signal transmission toward the AP 106. Indeed, the SS 102 can continue to target RF signal transmission toward the AP 104.

Data contained in the RF signals transmitted by the SS 102 and detected by the AP 106 can be extracted and communicated from the AP 106 to the AP 104, or another suitable device or system, as the uplink supplemental data 150. The uplink supplemental data 150 can be processed with corresponding uplink data received from the SS 102 by the AP 104 in order to improve the integrity of the of the uplink data.

The uplink data and uplink supplemental data 150 can be processed using a suitable algorithm. The algorithm can, for example, compare the data received by the AP 104 to the uplink supplemental data 150. When differences between the data sets are identified, the algorithm can analyze the data sets, or information pertaining to the signals in which the data sets were received, to estimate which data set likely is correct. In an another example, the algorithm can coherently combine the uplink data and the uplink supplemental data 150 to enable detection of the data transmitted by the SS 102 when the uplink data and/or uplink supplemental data 150 themselves may not be sufficient to detect the transmitted data.

Figure 2:
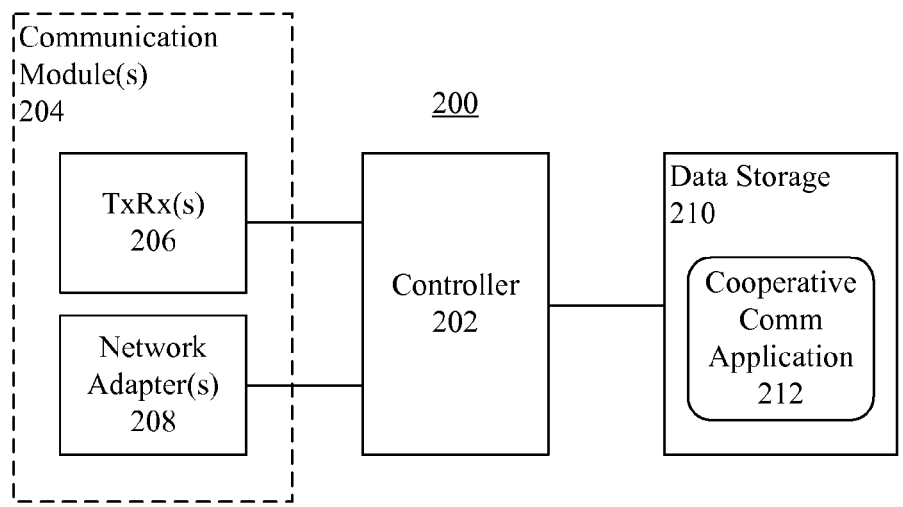
FIG. 2 depicts a block diagram of an access point that is useful for understanding the present invention.

FIG. 2 depicts a block diagram of an AP 200 that is useful for understanding the present invention. The AP 200 can include a controller 202, which may comprise, for example, one or more central processing units (CPUs), one or more digital signal processors (DSPs), one or more application specific integrated circuits (ASICs), one or more programmable logic devices (PLDs), a plurality of discrete components that can cooperate to process data, and/or any other suitable processing device. In an arrangement in which a plurality of such components are provided, the components can be coupled together to perform various processing functions as described herein.

The AP 200 can include one or more communication modules 204, for example one or more transceivers 206 and/or one or more network adapters 208 communicatively linked to the controller 202. The transceiver(s) 206 can be configured to communicate with one or more devices in accordance with any other suitable communications standards, protocols, and/or architectures, or a suitable combination of standards, protocols, and/or architectures.

In an arrangement in which the AP 200 implements beamforming, the transceiver 206 can implement a plurality of transmit/receive chains, as is known to the skilled artisan. Optionally, the transceiver(s) 206 also can be configured to communicate with one or more other APs, devices and/or systems, for example over one or more wireless backhaul channels.

The network adapter(s) 208 can be configured to communicate via wired and/or wireless communication links, and can be used by the AP 200 to communicate with other APs, devices and/or systems. For instance, the network adapter(s) 208 can be used in lieu of, or in addition to, the transceiver(s) 206 in order to communicate over backhaul channels. The network adapter(s) 208 also can be configured to communicate data in accordance with any other suitable communications standards, protocols, and/or architectures, or a suitable combination of standards, protocols, and/or architectures.

The AP 200 further can include a data storage 210 communicatively linked to the controller 202. The data storage 210 can include one or more storage devices, each of which may include, but is not limited to, a magnetic storage medium, an electronic storage medium, an optical storage medium, a magneto-optical storage medium, and/or any other storage medium suitable for storing digital information. In one arrangement, the data storage 210 can be integrated into the controller 202, though this need not be the case.

A cooperative communication application 212 can be stored on the data storage 210 or otherwise made accessible to the controller 202. The cooperative communication application 212 can be executed by the controller 202 to implement the methods and processes described herein that are performed by the AP 200. For example, the controller 202 can execute the cooperative communication application 212 to determine whether a supplemental communication link with one or more SSs is desirable. Such determination can be based on the controller identifying whether a channel quality of a primary communication link established between the SS and the first AP is below a threshold value or, as noted, can be based on any of a number of other factors.

The controller 202 also can execute the cooperative communication application 212 to select one or more other APs which are candidates for establishing supplemental communication links. For example, the controller 202 can select the second AP. Further, the controller 202 can generate requests to such APs, and receive responses from such APs. Moreover, the controller 202 can select the manner in which cooperative communication is to be implemented.

Via one or more of the communication module(s) 204, the controller 202 can communicate to at least the second AP information that identifies the SS and a pilot zone in which downlink supplemental data is to be transmitted from the second AP to the SS and/or in which data transmitted by the SS is to be detected as uplink supplemental data The information optionally may include an OFDMA sub-channel permutation parameter that indicates a sub-channel permutation mode to be used within the pilot zone, a permutation base parameter that indicates an initial condition to be used for a permutation mode within the pilot zone, and/or a scrambling sequence parameter that indicates a scrambling sequence to be used within the pilot zone. The optional information also may include information that identifies a location of the SS and/or a movement related to the SS.

Via the communication module 204, the controller 202 can communicate downlink supplemental data to the selected AP to communicate with the SS over a supplemental communication link. As noted, the downlink supplemental data can improve integrity of data communicated from the first AP to the SS when the downlink supplemental data is transmitted to the SS from the second AP.

The controller 202 also can receive uplink supplemental data from one or more of the other APs via the communication module 204, and can process the uplink supplemental data to improve the integrity of data received by the AP 200 from the SS, for example as described herein.

Via the communication module(s) 204, the controller 202 also can execute the cooperative communication application 212 to receive requests from other APs, devices and/or systems to implement cooperative communication, and generate responses to such requests. In addition, the controller 202 can receive, via the communication module 204, downlink supplemental data from other APs (or other suitable devices or systems), and communicate the downlink supplemental data to SSs to improve the integrity of data communicated by other APs to the SSs. The downlink supplemental data can be communicated to the SSs via the transceiver(s) 206.

Moreover, via the transceiver(s) 206, the controller 202 can detect signals transmitted by the SS and, in some arrangements, extract data contained in such signals as uplink supplemental data. In such arrangements, the controller 202 can communicate the uplink supplemental data to another AP to improve the integrity of data communicated from the SS to the other AP.

FIG. 3 is a flowchart presenting a method 300 of cooperative communication that is useful for understanding the present invention. The method 300 can begin in a state in which a communication session has been established between a SS and a first AP. At step 302, in response to determining that a supplemental communication link with the SS is desirable, at least a second AP can be identified to establish the supplemental communication link with a SS. The supplemental communication link can be desirable if, for example, the channel quality of a primary communication link between the communication and the first AP is below a threshold value. As previously noted, the desirability of the supplemental communication link can be based on any of a number of other factors.

At step 304, information can be communicated to the second AP. The information can identify the SS and a pilot zone in which downlink supplemental data is to be transmitted from the second AP to the SS. Optionally, the information communicated to the second AP can include information that identifies a channel resource with which to communicate with the subscriber station, an identification of at least one pilot zone assigned to the second AP for transmitting pilot symbols to the SS, an OFDMA sub-channel permutation parameter that indicates a sub-channel permutation mode to be used within the pilot zone, a permutation base parameter that indicates an initial condition to be used for a permutation mode within the pilot zone, and/or a scrambling sequence parameter that indicates a scrambling sequence to be used within the pilot zone. The optional information also may include information that identifies a location of the SS and/or a movement related to the SS.

At step 306, downlink supplemental data can be communicated to the second AP. The downlink supplemental data can be data that improves integrity of data transmitted from the first AP to the SS when the supplemental data is transmitted to the SS from the second AP in coordination with data transmitted to the SS from the first AP. In one arrangement, the downlink supplemental data can be at least substantially the same as data being transmitted by the first AP to the SS. In another arrangement, the downlink supplemental data can be data that is coded to provide error detection or error correction for data transmitted by the first AP to the SS.

FIG. 4 is a flowchart presenting a method 400 of cooperative communication that is useful for understanding the present invention. Again, the method 400 can begin in a state in which a communication session has been established between a SS and a first AP. At step 402, in response to determining that a supplemental communication link with the SS is desirable, at least a second AP can be identified to establish the supplemental communication link with a SS. The supplemental communication link can be desirable if, for example, the channel quality of a primary communication link between the communication and the first AP is below a threshold value and/or can be based on any of a number of other factors.

At step 404, information can be communicated to the second AP. The information can identify the SS and a pilot zone allocated to the SS to transmit uplink data to the first AP. Optionally, the information communicated to the second AP can include information that identifies a channel resource with which to receive transmissions from the subscriber station, for example as previously described.

At step 406, uplink supplemental data can be received from the second AP. The uplink supplemental data can correspond to data transmitted from the SS to the first AP and, when the uplink supplemental data is detected by the second AP, the uplink supplemental data can improve integrity of the data transmitted from the subscriber station to the first AP. In illustration, the uplink supplemental data can be data extracted from at least one RF signal transmitted by the SS in the pilot zone and detected by the second AP. The uplink supplemental data can be processed to improve the integrity of data transmitted from the SS to the first AP.

Figure 5:
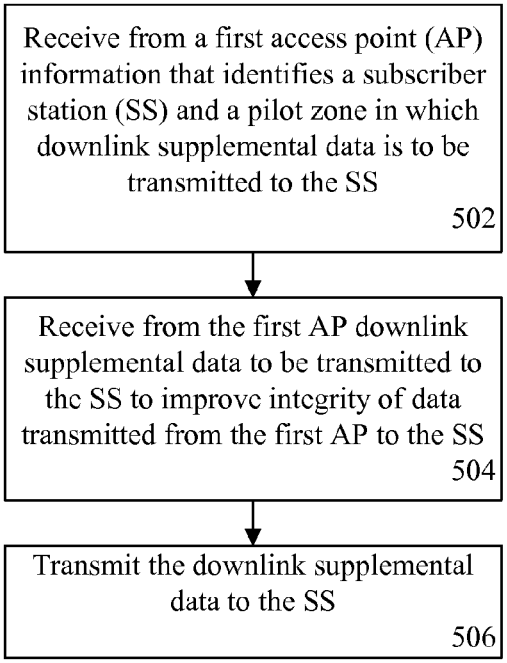
FIG. 5 is another flowchart that is useful for understanding the present invention.

FIG. 5 is a flowchart presenting a method 500 of cooperative communication that is useful for understanding the present invention. The method 500 can begin in a state in which a communication session has been established between a SS and a first AP. At step 502, information that identifies the SS and a pilot zone in which downlink supplemental data is to be transmitted to the SS can be received from the first AP. The downlink supplemental data can be data that is to be transmitted to the SS in order to improve integrity of data communicated from the first AP to the SS. Optionally, the information received from the first AP also can include information that identifies a channel resource with which to transmit data to the SS, for instance information previously described herein.

At step 504, the downlink supplemental data can be received from the first AP. At step 506, the downlink supplemental data can be transmitted to the SS within the pilot zone.

Figure 6:
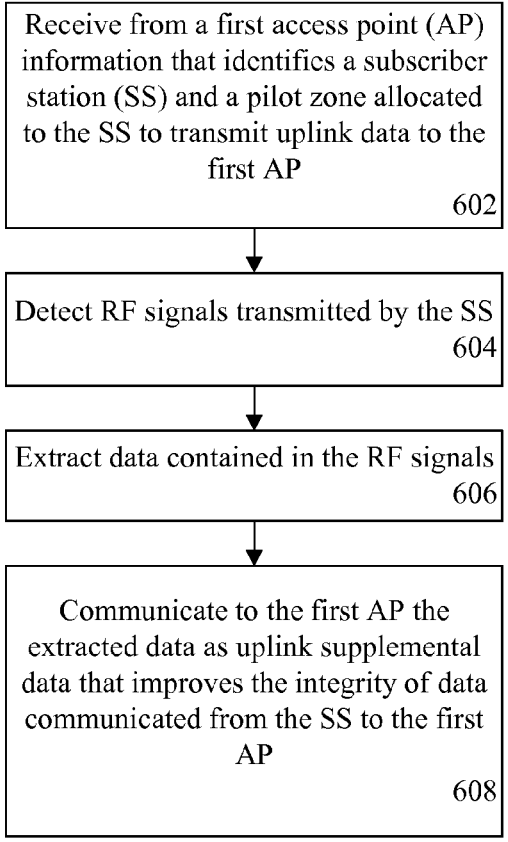
FIG. 6 is another flowchart that is useful for understanding the present invention.

FIG. 6 is a flowchart presenting a method 600 of cooperative communication that is useful for understanding the present invention. The method 600 can begin in a state as described for the method 500 of FIG. 5. At step 602, information can be received from a first AP that identifies a SS and a pilot zone allocated to the SS for transmitting uplink data to the first AP. Optionally, the information received from the first AP also can include information that identifies a channel resource with which to transmit data to the SS, such as the information previously described in the previous examples.

At step 604, RF signals transmitted by the SS can be detected. At step 606, data contained in the RF signals can be extracted. At step 608, the extracted data can be communicated to the first AP as uplink supplemental data that improves the integrity of data transmitted from the SS to the first AP.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The present invention can be realized in hardware, software, or a combination of hardware and software. The present invention can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with an application that, when being loaded and executed, controls the processing system such that it carries out the methods described herein. The present invention also can be embedded in a program storage device readable by a machine, tangibly embodying a program of instructions executable by the machine to perform methods and processes described herein. The present invention also can be embedded in an application product which comprises all the features enabling the implementation of the methods described herein and, which when loaded in a processing system, is able to carry out these methods.

As used herein, the term "communicate" means to send and/or receive information and/or data. The information and/or data can be sent or received over a wired propagation medium and/or over a wireless propagation medium. The term "transmit," as used herein, means to send information and/or data over a wireless propagation medium, for example using a suitable transmitter (e.g. transceiver) and antenna.

The terms "computer program," "software," "application," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, an application can include, but is not limited to, a script, a subroutine, a function, a procedure, an object method, an object implementation, an executable application, an applet, a servlet, a MIDlet, a source code, an object code, a shared library/dynamic load library and/or other sequence of instructions designed for execution on a processing system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language).

Moreover, as used herein, ordinal terms (e.g. first, second, third, fourth, fifth, sixth, seventh, eighth, ninth, tenth, and so on) distinguish one message, signal, item, object, device, system, apparatus, step, process, or the like from another message, signal, item, object, device, system, apparatus, step, process, or the like. Thus, an ordinal term used herein need not indicate a specific position in an ordinal series. For example, a process identified as a "second process" may occur before a process identified as a "first process." Further, one or more processes may occur between a first process and a second process.

This invention can be embodied in other forms without departing from the spirit or essential attributes thereof Accordingly, reference should be made to the following claims, rather than to the foregoing specification, as indicating the scope of the invention.

What is claimed is:

1. A method of communicating with a subscriber station, comprising:

responsive to determining that a supplemental communication link with the subscriber station is desirable, identifying at least a second access point to establish the supplemental communication link with the subscriber station;

communicating to the second access point information that identifies the subscriber station, that identifies a channel resource to be used by a first access point for transmission of dedicated pilots and data to the subscriber station, and that enables the second access point to construct an equivalent dedicated pilot sequence as the first access point for use within the channel resource used by the first access point, wherein the channel resource is also to be used by the second access point for transmission of dedicated pilots and supplemental data to the subscriber station; and communicating to the second access point downlink supplemental data that improves integrity of data transmitted from the first access point to the subscriber station when the downlink supplemental data is transmitted from the second access point to the subscriber station in coordination with the data transmitted from the first access point using the equivalent dedicated pilot sequence and the channel resource used by the first access point; and wherein no information is provided to the subscriber station pertaining to transmission of supplemental data by the second access point and pilots used by the second access point in the channel resource.

2. The method of claim 1, wherein determining that the supplemental communication link with the subscriber station is desirable comprises:
  identifying whether a channel quality of a primary communication link established between the subscriber station and the first access point is below a threshold value.

3. The method of claim 1, further comprising:
  communicating to the second access point configuration information for use by the second access point when transmitting to the subscriber station comprising:
  a permutation base parameter that indicates an initial condition to be used for a permutation mode; and
  a scrambling sequence parameter that indicates a scrambling sequence.

4. The method of claim 1, further comprising:
  communicating to the second access point at least one type of information selected from a group consisting of information that indicates to the second access point a location of the subscriber station and information that indicates to the second access point a movement related to the subscriber station.

5. The method of claim 1, wherein communicating to the second access point downlink supplemental data comprises:
  communicating to the second access point data that is at least substantially the same as the data being transmitted by the first access point to the subscriber station.

6. A first access point, comprising:
  a controller that, during a communication session between the first access point and a subscriber station, determines whether a supplemental communication link with the subscriber station is desirable; and
  at least one communication module;
  wherein:
    when the controller determines that the supplemental communication link with the subscriber station is desirable:
      via the communication module, the controller communicates to at least a second access point information that identifies the subscriber station, that identifies a channel resource to be used by the first access point for transmission of dedicated pilots and data to the subscriber station, and that enables the second access point to construct an equivalent dedicated pilot sequence as the first access point for use within the channel resource used by the first access point; wherein the channel resource is also to be used by the second access point for transmission of dedicated pilots and supplemental data to the subscriber station; and
      via the communication module, the controller communicates to the second access point downlink supplemental data, the downlink supplemental data improving integrity of data communicated from the first access point to the subscriber station when the downlink supplemental data is transmitted from the second access point to the subscriber station in coordination with the data transmitted from the first access point using the equivalent dedicated pilot sequence and the channel resource used by the first access point; and
    wherein no information is provided to the subscriber station pertaining to transmission of supplemental data by the second access point and pilots used by the second access point in the channel resource.

7. The first access point of claim 6, wherein the controller identifies whether a channel quality of a primary communication link established between the subscriber station and the first access point is below a threshold value.

8. The method of claim 1, further comprising:
  communicating to the second access point configuration information for use by the second access point when transmitting to the subscriber station comprising an orthogonal frequency-division multiple access subchannel permutation parameter that indicates a subchannel permutation mode.

9. The method of claim 1, wherein communicating to the second access point downlink supplemental data comprises:
  communicating to the second access point data that is substantially the same as the data being transmitted by the first access point to the subscriber station.

* * * * *